Patented Jan. 10, 1928.

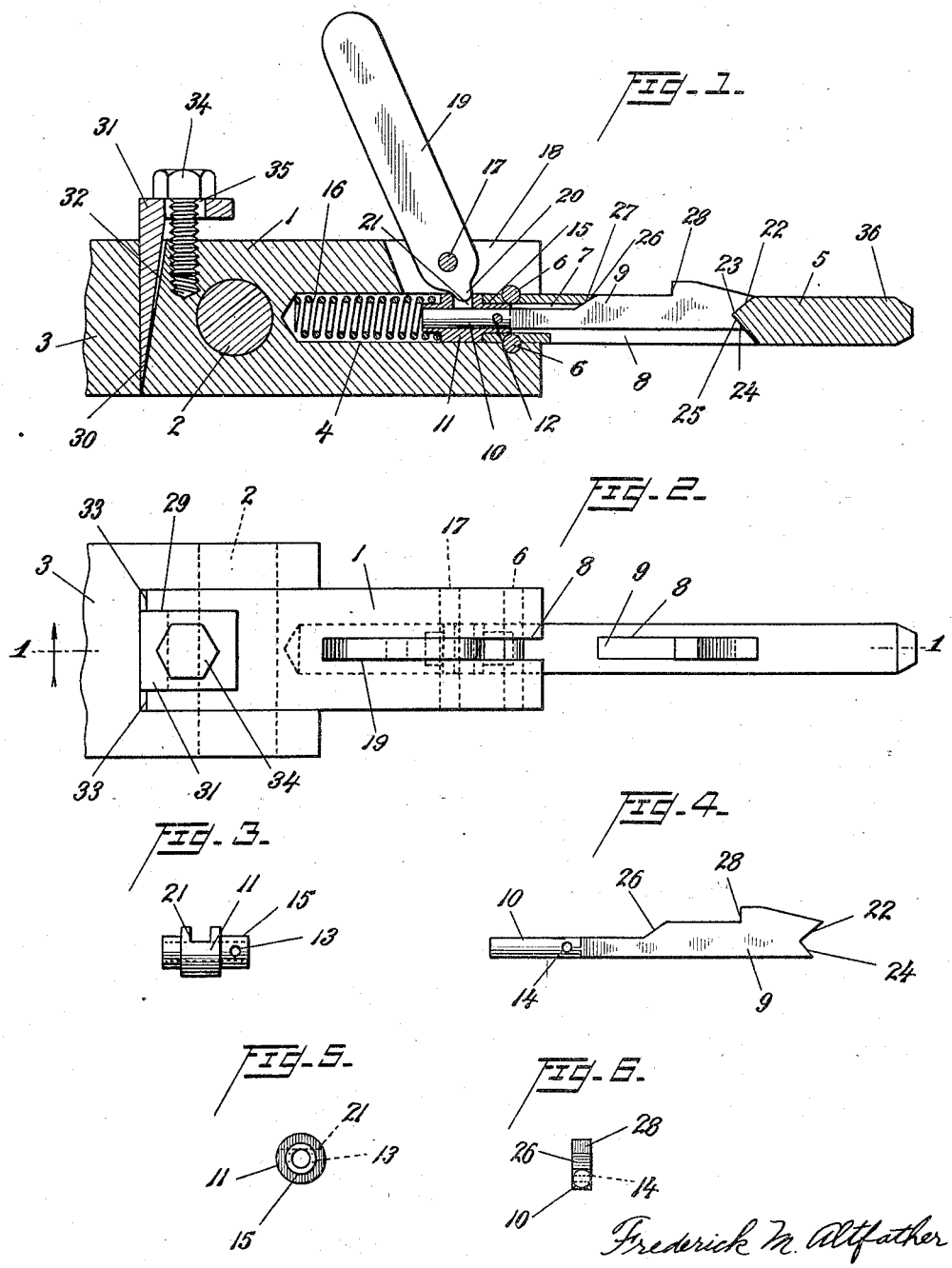

1,655,641

UNITED STATES PATENT OFFICE.

FREDERICK M. ALTFATHER, OF COVINGTON, VIRGINIA, ASSIGNOR TO COVINGTON MACHINE COMPANY, INC., OF COVINGTON, VIRGINIA, A CORPORATION OF VIRGINIA.

TRAIN-HOSE NIPPLE-PULLING TOOL.

Application filed February 6, 1925. Serial No. 7,322.

This invention relates to tools for operating on nipples of train hose, and comprises all improvements disclosed in this application. The primary object is to produce an easily made tool of rugged construction which is positive and reliable in operation.

The above and other objects which will hereinafter appear, are attained by new and useful improvements as disclosed in this application. To enable others skilled in the art to fully understand the essential features of the improvements, drawings have been annexed as a part of this disclosure.

Fig. 1 is a longitudinal section on line 1—1 of Fig. 2.

Fig. 2 is a top plan view of the tool.
Fig. 3 is a side elevation of the collar.
Fig. 4 is a side elevation of the dog.
Fig. 5 is an end elevation of Fig. 3.
Fig. 6 is an end elevation of Fig. 4.

The tool comprises a stock 1 horizontally pivoted at 2 to a carrier or slide 3 for operative movement similar to the construction shown for the nipple puller and nipple assembler in Figs. 9 and 12 of Patent 1,461,578.

Stock 1 is provided with a hole 4 in which one end of the barrel 5 is secured preferably by pins 6. The barrel has a bore 7 merging with a slotted portion 8. Dog 9 is mounted in the barrel with the cylindrical end 10 secured to collar 11 by means of pin 12 engaging in holes 13 and 14 of the collar and dog respectively. The collar 11 has a loose fit in hole 4 and the end 15 has a loose fit in bore 7 to permit the dog to have lateral movement in slot 8. Spring 16 pushes outwardly on collar 11 to normally maintain the dog in its operative position. Pivoted at 17 in slot 18 of stock 1 is a lever 19 having a lug 20 engaging in cross slot 21 of collar 11 to permit the dog to be withdrawn to inoperative position by swinging lever 19 to the right against the action of spring 16.

When the dog is forced outwardly by spring 16, the shoulder 22 of the dog rides up on shoulder 23 of the barrel to cause the dog to move laterally of the barrel to operative position as shown in Fig. 1. To prevent the dog moving out too far, a shoulder 24 of the dog engages a shoulder 25 of the barrel. When the dog is withdrawn to the left by swinging lever 19 to the right, the shoulder 26 of the dog engages shoulder 27 of the barrel, and forces the dog to swing laterally to cause tooth 28 of the dog to move within the slot 8 so as to be in inoperative position.

In operation, as the carrier 3 moves to the right toward a hose nipple, lever 19 is held toward the right, thereby forcing the dog 9 to retracted or inoperative position. When tooth 28 has entered into the nipple a sufficient distance, lever 19 is released, whence the dog is forced by spring 16 into operative position with tooth 28 in position to engage the nipple to pull it out of the hose. By making tools of suitable sizes, the nipples of air, steam and signal hose can be pulled out of the hose.

To insure the barrel properly entering the hose nipple, an adjusting means is provided between the stock and carrier. Thus the stock has a recess 29, between the lower part of the wall 30 of which and the carrier 3, a wedge 31 engages. The upper portion 32 and the rear parts 33 of stock 1 are cut away to provide clearance. A screw 34 loosely passes through a hole 35 in the wedge. By adjusting screw 34 to force the wedge downward, the end 36 of dog 5 is moved upward. By adjusting the screw 35 upward, the wedge is permitted to move upward thereby permitting the end 36 to move downward.

While this wedge adjustment is shown on a pulling tool, it is intended for use on both pulling and assembling tools, for example on such tools as shown in Patent 1,461,578.

All changes which properly come within the spirit and range of equivalency of the following claims are intended to be embraced within the scope of the claims.

I claim:

1. In a device for operating on train hose nipples, a carrier, a stock pivoted to the carrier, and an adjustable means engaging between the carrier and stock at a location below the center of the pivot of the stock to the carrier for adjusting the stock to various positions about its pivot.

2. The device set forth in claim 1 in which the adjustable means comprises a wedge.

3. A nipple pulling tool comprising, a stock, a barrel secured to the stock and extending outwardly therefrom, and a dog bodily movable longitudinally, and having operative engaging means movable laterally of the barrel.

4. The nipple pulling tool set forth in claim 3 in which the dog when moving longitudinally of the barrel in one direction, engages means located adjacent the log and which causes the dog to be retracted laterally of the barrel to inoperative position.

5. The nipple pulling tool set forth in claim 3 in which the dog when moving longitudinally of the barrel in one direction, engages means located adjacent the log and which causes the dog to be forced outward laterally of the barrel to operative position.

6. The nipple pulling tool set forth in claim 3 in which the dog when moving longitudinally of the barrel in one direction, engages means located adjacent the log and which causes the dog to be retracted laterally of the barrel to inoperative position, and when moving longitudinally of the barrel in the other direction, engages means located adjacent the log and which causes the dog to be forced outward laterally of the barrel to operative position.

7. A nipple pulling tool comprising, a stock, a barrel secured to the stock and extending outwardly therefrom, a dog bodily movable longitudinally of the barrel, means located adjacent the log and adapted to engage the dog to force same outward laterally to operative position, and means to limit the outward lateral movement of the dog.

8. The nipple pulling tool set forth in claim 7 in which the means comprises a shoulder at an angle to the shoulder mentioned in claim 7.

9. The nipple pulling tool set forth in claim 3 with hand operating means positively connected to said dog to positively move the dog to inoperative position.

10. A nipple pulling tool comprising, a stock, a barrel secured to the stock and extending outwardly therefrom, a dog bodily movable longitudinally and having operative engaging means movable laterally, of the barrel, means located adjacent the log and adapted to engage the dog to force the dog laterally of the barrel to inoperative position, and hand operating means positively connected to said dog to force the dog longitudinally of the barrel and against said shoulder.

11. The nipple pulling tool set forth in claim 10 in which a spring normally pushes the dog longitudinally of the barrel toward the outer end of the barrel.

FREDERICK M. ALTFATHER.